United States Patent [19]

Keener

[11] Patent Number: 4,633,345
[45] Date of Patent: Dec. 30, 1986

[54] POSITIONING MISALIGNED DISK HEADS

[75] Inventor: Don S. Keener, Boca Raton, Fla.

[73] Assignee: International Business Machines Corp., Armonk, N.Y.

[21] Appl. No.: 737,623

[22] Filed: May 24, 1985

[51] Int. Cl.[4] .......................... G11B 5/55; G11B 5/56
[52] U.S. Cl. ........................................ 360/77; 360/78
[58] Field of Search ............................. 360/75, 77, 78

[56] References Cited

U.S. PATENT DOCUMENTS

| 4,086,659 | 4/1978 | Cizmic et al. | 360/78 |
| 4,297,734 | 10/1981 | Laishley et al. | 360/78 |
| 4,355,273 | 10/1982 | Du Vall | 360/78 |
| 4,455,583 | 6/1984 | Schultz | 360/78 |
| 4,516,177 | 5/1985 | Moon et al. | 360/78 |

Primary Examiner—George G. Stellar
Attorney, Agent, or Firm—Robert Lieber

[57] ABSTRACT

Technique for dynamically maintaining alignment of servo controls in a disk drive system which uses external indicia to position the head assembly between tracks containing embedded servo signals; the latter used to control track following. Plural pairs of phase staggered track reference signals are derived from the external indicia, and during system initialization an optimal pair is selected for controlling head positioning. The system is initialized both at power up time and after detection of certain errors. The selection is made by using each pair separately to direct positioning of the head assembly over a predetermined range of sampling positions at each of which centering offsets relative to the embedded servo signals are measured and recorded in association with the respective pair. Based on an evaluation of these offsets, the system microprocessor selects a reference signal pair having the least average offset to control subsequent head positioning operations. The system is then readied for "normal" read/write operation.

11 Claims, 18 Drawing Figures

FIG. 1 (PRIOR ART ENVIRONMENTAL DISK STORAGE SYSTEM)
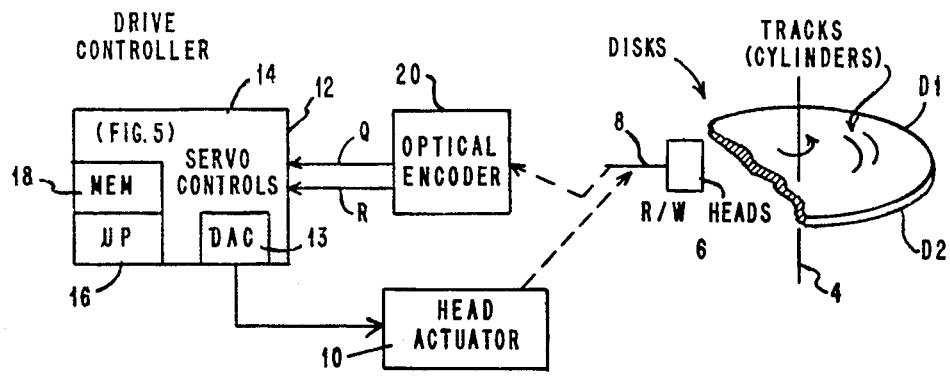
FIG. 2
SERVO SIGNALS (PRERECORDED)
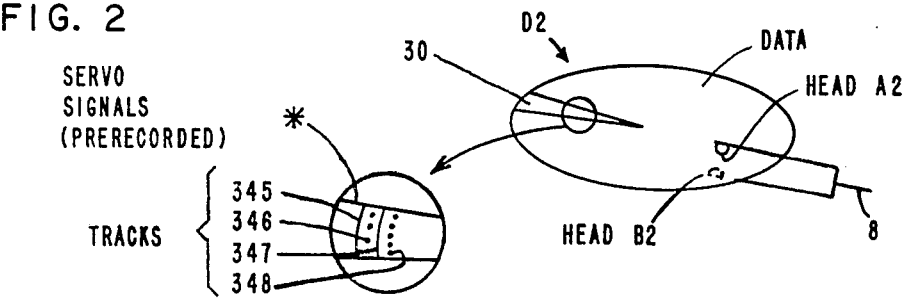
* SIGNALS ON TOP AND BOTTOM SURFACES RESPECTIVELY ASSOCIATED WITH ODD AND EVEN NUMBERED DATA STORAGE TRACKS/CYLINDERS
FIG. 3
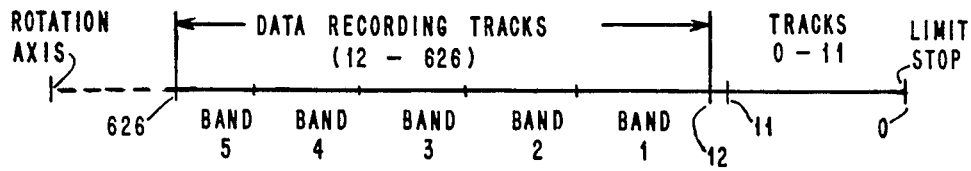

FIG. 4 (PRERECORDED SERVO PATTERN) *
| TRACK   | 0 | 1 | 2 | 3 | 4 | 5 | 6 | 7 | 8 | 9 | 10 | 11 | 12 | 13 | 14 |
|---------|---|---|---|---|---|---|---|---|---|---|----|----|----|----|----|
| HEAD A2 | N | L | N | L | N | L | N | L | N | L | N  | R  | N  | LR | N  |
| HEAD B2 | L | N | L | N | L | N | L | N | L | N | L  | LR | N  | LR |    |
\* — 0 = OUTERMOST GUARDBAND TRACK
    L = LEFT; R = RIGHT; LR = LEFT AND RIGHT; N = NONE
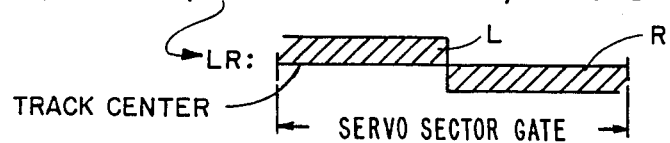
FIG. 5
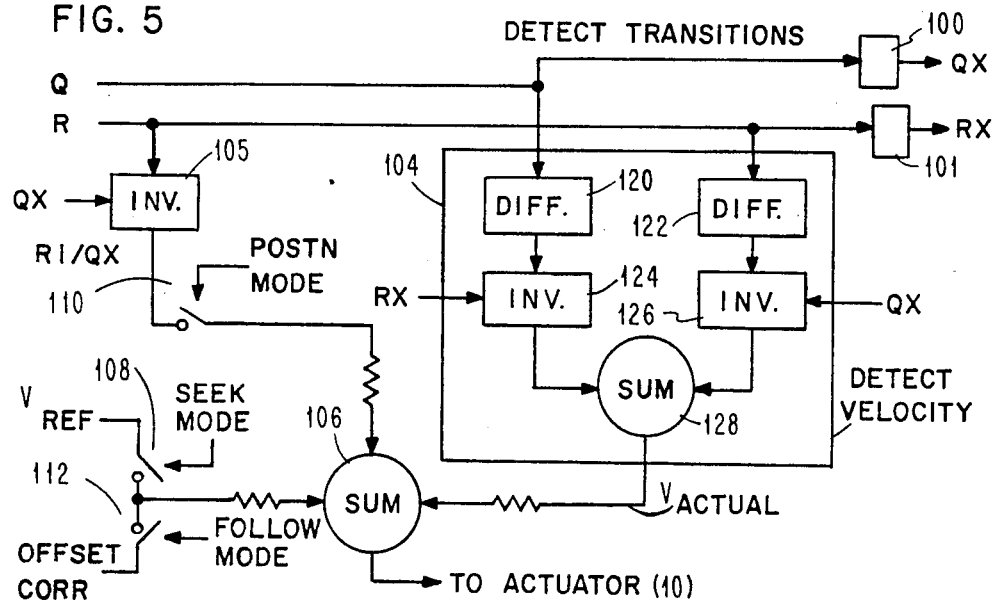

| TRACK | 30 | 31 | 32 | 33 | 34 | 35 | 36 | 37 | 38 | 39 | 40* | 41 |
|---|---|---|---|---|---|---|---|---|---|---|---|---|
| HEAD A2 | R | L | R | L | R | L | R | L | N | R | N | LR |
| HEAD B2 | L | R | L | R | L | R | L | R | N | N | LR | N |

\* TRACK 40 (TRACK #0 IN SYSTEM LOGICAL NOTATION) IS THE 'REFERENCE' TRACK POSITION FOR SUBJECT INITIALIZATION PROCEDURE; SEE FIG. 4 FOR DEFINITIONS OF L, R, LR AND N.

| VALUES OF "SERVO HEAD SELECT" (FIG. 10) | | | | LOCATE WITH | MEASURE IN ORDER (LEFT TO RIGHT) | | | |
|---|---|---|---|---|---|---|---|---|
| R1 | R2 | R3 | R4 | | | | | |
| 0 | 0 | 0 | 0 | R3 | R1 | R2 | R3 | R4 |
| 1 | 1 | 1 | 1 | | | | | |
| 0 | 0 | 0 | 1 | R2 | R4− | R1 | R2 | R3 |
| 1 | 1 | 1 | 0 | | | | | |
| 0 | 0 | 1 | 1 | R1 | R3− | R4− | R1 | R2 |
| 1 | 1 | 0 | 0 | | | | | |
| 0 | 1 | 1 | 1 | R4 | R2 | R3 | R4 | R1+ |
| 1 | 0 | 0 | 0 | | | | | |
| ——ANY OTHER—— | | | | ERROR, REMEASURE | | | | |

POSITIONING MISALIGNED DISK HEADS

BACKGROUND OF THE INVENTION

A common objective in contemporary magnetic disk storage systems is to provide high track densities and fast average access times at lowest cost. Such requirements can be met with a quasi closed loop servo system which relies on external indicia for controlling "seek positioning" between tracks and a combination of external indicia and embedded servo signals for controlling "track following". Such a servo system requires some level of alignment between the external indicia and the recorded data tracks as defined by the embedded servo information. This alignment must remain throughout all environmental aggravations such as temperature, orientation, shock and vibration. This tends to complicate the mechanical design of the system, as well as its manufacturing and quality control processes, increasing the difficulty of obtaining high production yields of satisfactorily operating systems with expected operational longevity.

A problem recently noted is that a percentage of such systems which pass manufacturing and quality inspection tests, nevertheless may exhibit faulty operation after shipment to end users. As noted presently, in a large proportion of such systems, the problem is traceable to "post shipment" misalignment between the external indicia (e.g. graduations in an optical grid) and embedded servo signals which is beyond the correction capability of the servo system. The embedded signals are recorded during the manufacturing process in precise optimal alignment with the external indicia, and in normal use should remain aligned within a predefined tolerance range (whereby the offset of the head assembly from track center, at completion of a seek positioning operation, should permit sensing of the correct embedded signals and correspondingly correct track following operation). However, in unusual circumstances, this normal alignment condition may be lost and cause the system to detect an error condition which appears as a hard failure.

The present invention involves recognitions that such failures—and related inconveniences to end users and replacement or repair costs incurred by the manufacturer—are avoidable by rather simple modifications of the circuits associated with sensing of the external indicia and the system initialization process.

SUMMARY OF THE INVENTION

The present invention involves recognitions that: (a) a significant number of seemingly hard failures, in servo controlled disk drive systems using external indicia and embedded servo signals for respectively controlling inter-track "seeks" and track following, are due to misalignment between the external indicia and the embedded servo signals which is beyond the correction range of the servo system; and (b) such failures can be avoided by means of rather simple changes to the circuits which sense the external indicia and the system initialization process.

Typically, in such systems, the circuits associated with sensing of the external indicia produce a single pair of "quadrature" and "reference" signals which vary sinusoidally in direct relation to the relative displacement between the head assembly and the indicia and are in phase quadrature relative to each other. Zero level transitions of these signals are supposed to correspond respectively to crossings of recording track ideal boundaries and centerlines.

In accordance with the present invention, the circuits associated with sensing of the external indicia are modified to produce plural pairs of phase staggered "quadrature" and "reference" signals, each pair in phase quadrature, and to allow for selective connection of any one of such pairs to the positioning servo controls. Furthermore, the system initializing procedure is modified to allow for selection of a connection between a most optimally aligned signal pair and the servo controls. In the modified procedure, each pair of quadrature and reference signals is applied separately to the positioning controls while the latter controls are directed to position the head assembly to a number of representative "sampling" positions within a predetermined range of tracks. A teach position, the offset between the head (ideal track centerline) and embedded servo signals (actual track centerline) is measured and recorded in association with the respectively applied pair of externally referenced signals.

The recorded values are processed to determine a "most optimum" set of (least) offset values associated with one pair of applied signals. The associated pair of signals is then continuously coupled to the servo control and the system is readied for normal read/write operations.

The foregoing and other features, objectives and advantages of the present invention will be understood from the following particular description of a preferred embodiment, as illustrated in the accompanying drawings.

BRIEF DESCRIPTION OF THE DRAWINGS

FIGS. 1–9 schematically illustrate the organization and operation of an exemplary disk storage system (hereafter "environmental system") to which the present invention can be advantageously applied as either a repair or improvement; and FIGS. 10–17 schematically illustrate modifications of the environmental system and related "start-up" operations in accordance with the present invention.

FIG. 1 schematically illustrates the exemplary environmental system;

FIG. 2 illustrates schematically the relation between embedded fine servo signals and recorded data;

FIG. 3 illustrates the track layout in the environmental system;

FIG. 4 illustrates signals in the servo sectors of outer guardband tracks which are used for locating a first data recording track which serves as a position reference for system initialization;

FIG. 5 is a schematic of the head positioning servo controls of the environmental system;

FIG. 6 illustrates the forms of signals derived from external indicia in the unmodified environmental system;

FIG. 7 is a flow diagram illustrating the operation of the environmental system without benefit of the present invention;

FIG. 8 illustrates the misregistration problem addressed by the present invention;

FIG. 9 illustrates circuits for forming servo correction signals by sensing embedded servo signals;

FIG. 10 is a schematic illustrating modification of the servo controls of the environmental system in accordance with the present invention;

FIG. 11 is a flow diagram illustrating the modified initializing procedure of the present invention;

FIG. 13 illustrates details of a circuit portion of FIG. 10;

FIG. 14 illustrates relationships between reference signals of FIG. 12B and physical tracks on the disks for explaining the present alignment process;

FIG. 15 illustrates a pattern of signals for unambiguously locating reference track 40;

FIG. 16 illustrates how "switch head" values and phases of signals Ri are associated; and FIG. 17 illustrates track layout in the presently modified system.

DETAILED DESCRIPTION

1. Introduction

Figure 6:
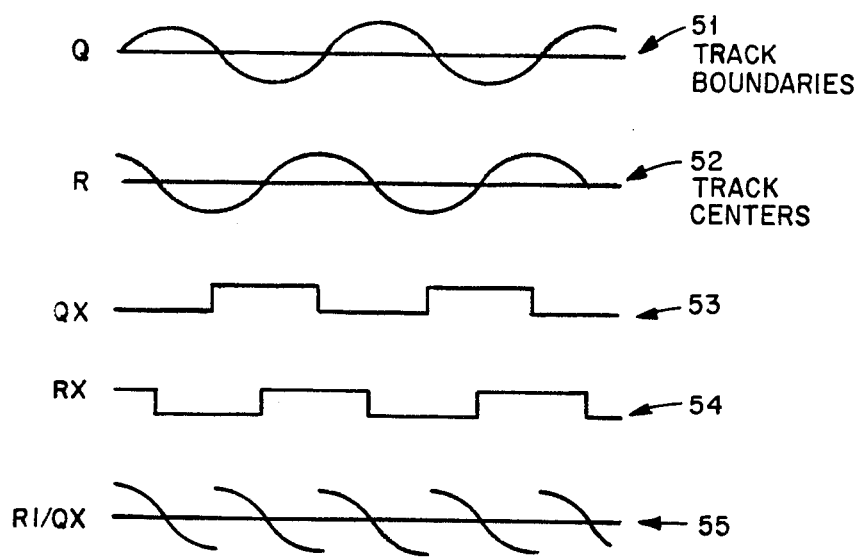

A typical system to which the present invention may be applied—as either an improvement or repair—is illustrated in FIGS. 1-7. The CMI-6000 family of disk drives made by Computer Memories Inc. is representative of this type of system. Referring to FIG. 1, this type of drive system (termed the "environmental system") may contain up to three disks providing a data storage capacity of between 12 and 40 megabytes unformatted. A not shown motor and linkage rotate the disks about an axis indicated generally at 4. Illustrated is a configuration of two disks D1, D2 with four recording surfaces. For this configuration, head assembly 6 contains four transducing heads, one for each disk surface, mounted on carrier 8. Carrier 8 is movable by actuator 10, under the direction of servo controls 12, to position the heads bidirectionally over a densely configured range of recording and guard band tracks discussed later. Servo controls 12 are part of the drive controller subsystem 14 which includes digital to analog converter (DAC) 13, microprocessor 16 and memory 18.

Carrier 8 is optically linked to a not shown frame reference associated with optical encoder 20 which provides a pair of "quadrature" and "reference" signal outputs, Q and R, respectively. Q and R, which are applied to the servo controls 12 for controlling track positioning operations, vary sinusoidally as a function of the displacement of the head assembly across the disk surface. Movement from any data track centerline to the centerline of an adjacent track is represented by 180 degrees of angular displacement in these signals. These signals are in quadrature phase relation relative to each other, and their zero level (polarity) transitions are detected by servo controls 12 as respective indications of crossings of track boundaries and centerlines.

Referring to FIG. 2, for the configuration of FIG. 1 a small sector portion 30 of the recordable surface area of the lower disk D2 is reserved for storage of embedded servo signals. The rest of the recordable surface area of D2, and the entire recordable suface area of D1, are available for storage of data and related control information. The recordable surface areas of D1 and D2 each contain more than 600 cylindrically aligned tracks (see FIG. 3), which are assigned identifying address numbers directly related to their distances from a reference track adjacent the outer guardband (tracks 0-39 in FIG. 3). Embedded servo signals for odd and even numbered tracks are respectively disposed on the top and bottom surfaces of D2, in corresponding track portions of sector 30, in order to avoid crosstalk effects between servo signals associated with adjacent data tracks. Thus, servo signals for odd and even tracks are respectively read by heads A2 and B2 (FIG. 2).

As part of the system manufacturing process, the servo signals are recorded at track positions effectively designated by zero level transitions in the output R of optical encoder 12 (which represent track center crossing indications). Consequently, the recorded servo signals should be in precise alignment with the external indicia when the system is shipped, and in normal usage should remain aligned within tolerance limits associated with proper operation of the system servo controls. Hitherto, as explained previously, departures from this limiting range have been regarded as hard failure conditions, requiring repair or replacement of the system, which are avoided by the present invention.

As shown in FIG. 3, in this system each disk has 627 track positions which, if numbered consecutively beginning with the outermost position, would be numbered tracks 0 through 626. However, since the tracks useful for recording data begin at the 13th track position inward from the outer limit stop (track 12 in FIG. 3), that position is addressed by the system as track number 0, and successive tracks inward from that position are addressed as tracks 1 through 614. Tracks outward from the reference position (tracks numbered 0–11 in FIG. 3) represent a "guardband" to which the head assembly is moved during initialization. The system addresses these tracks as track addresses —1 through —12 in the sequence of their spacing from the reference position.

FIG. 4 shows how the environmental system initially locates track 12 in the guardband area (using the simple numbered scheme of FIG. 3) as a position reference. Tracks in this guardband area contain special servo signal patterns which are intended to unambiguously indicate the location of the reference track position. In this figure, signal bursts normally offset outward and inward from track centers are termed left (L) and right (R) bursts (in association to their relationships to one another when viewed on an oscilloscope). The left burst, the one which occurs first in time, is immediately followed by the right burst. Thus, assuming that the head assembly is within the normal limits of acceptable alignment, upon movement of the head assembly out to the limit stop and then inward, the servo signals detected in transit through guardband tracks 0–11 (assuming appropriate switching between heads A2 and B2 at successive positions) would appear to the system as a series of left only bursts followed by a single right only burst. The track following this single right burst, track 12, is the reference track for alignment. It should be noted that the single bursts prior to the reference track are not offset from the track centerline so as to insure optional readability in misaligned situations.

Accordingly, this guardband pattern allows the system to initialize the head assembly to the track 12 reference position, assuming that the external optical indicia and recorded servo signals are within tolerance registration. From this position, the head assembly can be positioned to other tracks by conventional "dead reckoning" servo control procedures discussed later.

FIGS. 5–9 illustrate the system servo controls, the explanation of which requires an understanding of the form and functions of signals derived from the optically sensed external indicia. FIG. 6 illustrates these signal forms. Signals Q and R, respectively, shown at 51 and 52 in FIG. 6, have sinusoidal forms as previously explained and are in phase quadrature (the phase of R leading the phase of Q by 90 degrees). Pulse signals QX and RX, shown at 53 and 54, are derived, respectively, from Q and R by detecting 0 levels amplitude transitions of the latter signals. Zero crossing transitions in QX and RX, respectively, represent crossings of track boundaries and track centerlines to the system servo controls of FIG. 5. Signals RI/QX have sinusoidal forms and correspond to portions of signal R translated in part directly and in part inverted depending on states of QX.

Referring to FIG. 5, signals Q and R, as provided by optical encoder 12, are respectively applied to polarity detecting circuits 100 and 102 which form the signals QX and RX mentioned above. R and Q are also applied to "velocity detecting" circuit 104, and R is also applied to gated inverting circuit 105 controlled by QX. Circuit 104 operates to detect actual velocities of the assembly (for comparison to stored "ideal" velocity functions discussed below or to provide damping to the positioning function). Circuit 105 operates to produce signal RI/QX by translating portions of R coincident with low portions of QX unchanged, and translating other portions of R coincident with high levels of QX in inverted form.

Summing circuit 106 controls servo actuator 10. In seek mode, while the head assembly is being positioned to a new track, circuit 106 provides signals which represent the signed difference between actual and desired (reference) head velocities. Circuit 106 receives its "actual velocity" input from circuit 104 and its reference velocity input at $V_{REF}$. $V_{REF}$ is supplied by microprocessor 16 via a not shown memory table, digital-to-analog converter 13 (FIG. 1), and switch 108.

In seek mode, $V_{REF}$ is initially "high" and the actual velocity is initially 0. Thus, output of circuit 106 is initially high and with a polarity tending to move the head rapidly toward the destination track. As the head moves, track boundary crossings represented by zero crossings of signal Q are detected and used to decrement a "tracks to go count" maintained by the microprocessor. As this count decreases, $V_{REF}$ is decreased in a predetermined progression designed to move the head rapidly to the destination track and bring it to a smooth stop. As some point in the motion, the values of actual and reference velocities intersect, causing the difference output of circuit 106 to reverse polarity and decelerate the head assembly. This decreases the actual velocity and thereby lengthens the time between track crossings, so that the actual and reference velocities thereafter track the same ideal profile.

When the tracks to go count becomes 0, indicating that the head has crossed the boundary of the destination track (assuming proper registration between phase transitions of encoder output Q and actual track boundaries), the servo system is switched to "positioning" mode. At this point, the actual head velocity should be approaching 0. In this mode, switch 108 opens and switch 110 and 112 closes, causing controlling inputs to sum circuit 106 (hence actuator 110) to control the form of RI/QX (FIG. 6, line 55).

Switch 112 applies offset corrections to circuit 106 (hence actuator 110) which in normal operation should tend to decrease the instantaneous offset between the head and the center of the destination track. The offset correction includes an initial value which is extracted from a table described below and applied via DAC 13, in combination with unit level increments determined by the sensing of embedded servo signals aligned with the center of the destination track, as described later.

The above mentioned table of initial predicted offset correction values is established when the drive system is powered up. During this interval, the head is positioned optically (i.e. with reference only to phase transitions of encoder outputs R and Q) to each of the five track bands (see FIG. 3), and offsets of actual track centers from ideal track centers are monitored at several positions in each band (by sensing the embedded servo signals at such position and applying unit increments of correction to actuator 10 which correspond to the polarity of the difference in magnitude between the left and right portions of such signals—see FIG. 4—until the sign of the sensed difference reverses; the number of corrective increments representing the offset). The average of such offsets within each band is determined, and a corresponding correction factor for initially countering this average offset is stored in the microprocessor memory. Thus, on subsequent seeks to any track in a band, the respective correction factor is initially applied to the servo actuator to position the head closer to track center.

Velocity detection circuit 104 includes circuits 120 and 122 for respectively differentiating Q and R, and circuits 124 and 126 for respectively translating portions of signals received from 120 and 122 in inverted and uninverted forms, depending respectively on states of RX and QX. Summing circuit 128 sums outputs of circuits 124 and 126 to form the final output representing actual head velocity.

Figure 7:
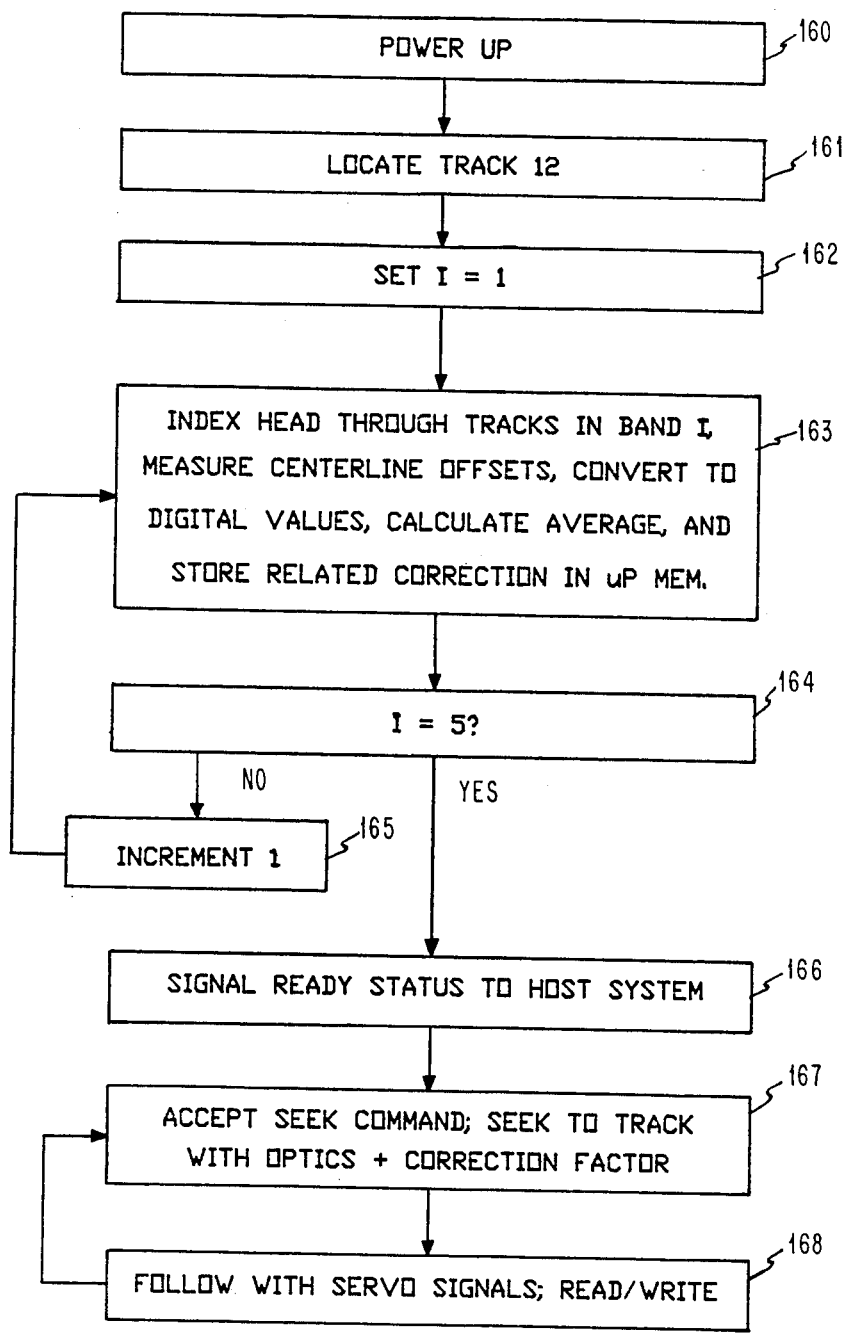

The foregoing "normal" operations of the environmental system are summarized in the flow diagram of FIG. 7. At the power up time, the head is located to the outermost track used for data recording (track 12) and a band count parameter "i" is set to a value of 1 (steps 160-162, FIG. 7). Then, an offset correction for band 1 is determined and stored in the microprocessor memory (step 163). Next, the value of "i" is incremented, and the foregoing process is repeated for bands 2-5 (see steps 164, 165). Finally, the storage system is readied for "normal" read/write operation and an indication of such readiness is given to the respective host computing system (step 166). Thereafter, the storage system responds to conventional I/O commands from the host system to perform track seek positioning operations (steps 167, 168) and read or write data.

Figure 8:
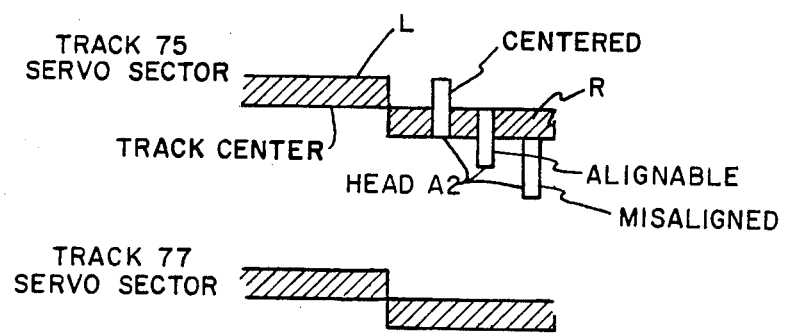

As shown in FIG. 8, the foregoing operations of the environmental system are only effective if the position of the head assembly when the servo system switches to track following mode is within certain "capture limits". If the head assembly is sufficiently in alignment with the track at this time to allow the appropriate head, A2 or B2, to properly sense a portion of the corresponding servo signal (see "alignable" position in FIG. 8), resulting servo corrections will drive the head towards the correct centered position and hold it there.

However, if such alignment is lacking, the servo may be unable to correct the head's position with respect to the data track centerline. This occurs because of the limited range nature of servo systems using external indicia. If the servo head is actually sensing the servo data for the target track but the magnitude of offset between the head's position and the true track location exceeds the correction range of the servo, then an error will occur. A situation could also occur where the head which should be reading servo information is unable to sense any servo information. This occurs if the misalignment is an approximate odd multiple of a track width. In this case, the servo information for the track that the heads are positioned over is on the other side of the disk. This situation also results in an error.

Figure 9:
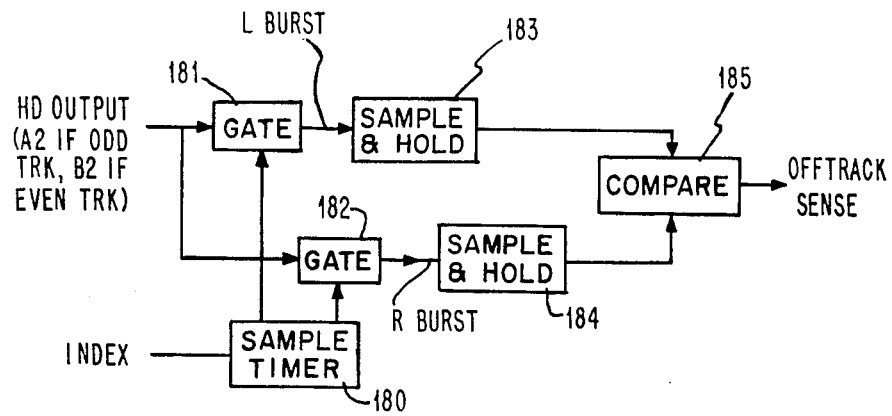

FIG. 9 indicates how the environmental system senses embedded servo signals. Circuit 180 senses an index mark on the rotating spindle which supports the disks and generates staggered pulses successively enabling gates 181 and 182. These pulses are timed to coincide respectively with passage of the left and right portions of the servo signal (L and R, FIG. 4) beneath head A2 or B2 (whichever is then being used to sense the servo signal; i.e. depending on whether the track being followed is odd or even). Output of head A2 or B2 is applied to gates 181 and 182, so that under the control of the pulses just described, the left and right portions of the servo burst are respectively passed through gates 181 and 182. Relative amplitudes of these gated portions are distinguished as an indication of the position of the head relative to the track centerline and thereby as an indication of the servo correction required for track following.

Accordingly, outputs of gates 181 and 182 are respectively sampled and held by circuits 183 and 184 (for the remainder of the disk revolution cycle) and compared by comparator circuit 185. The output of comparator 185, labelled "offtrack sense", is used to develop a unit increment of correction for application to the servo actuator (via switch 112, FIG. 5). This increment has a polarity opposite to that of the offtrack sense signal so that the head is caused to move closer to track center by a small amount during the current revolution (i.e. by an amount which may not fully nullify the offset). The offtrack sense signal is also used in the initializing process of the present invention as described next.

PREFERRED EMBODIMENT—GENERAL CONSTRUCTION AND OPERATION

Figure 10:
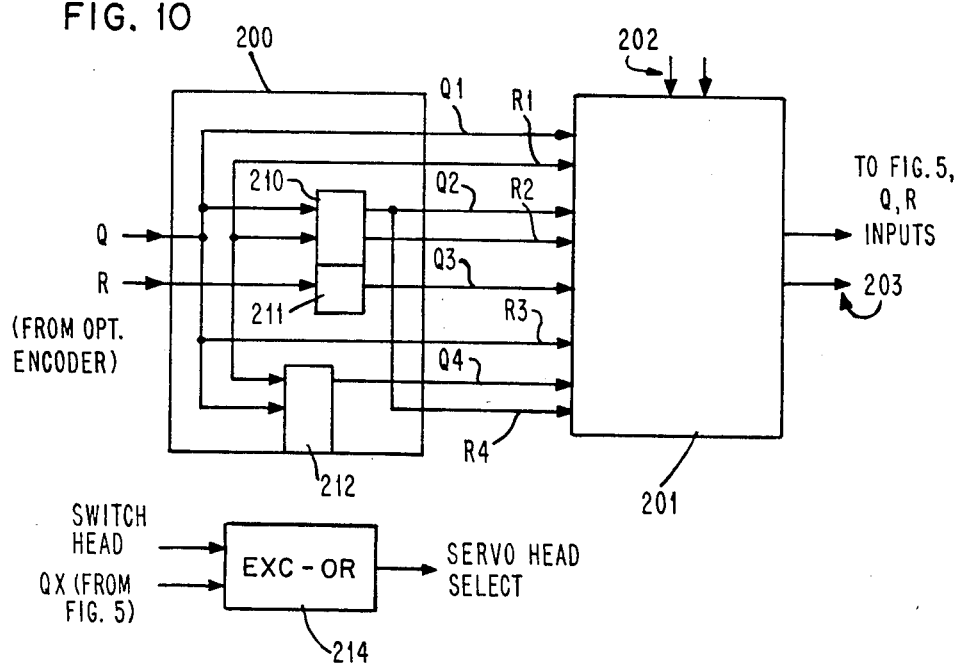
Figure 11:
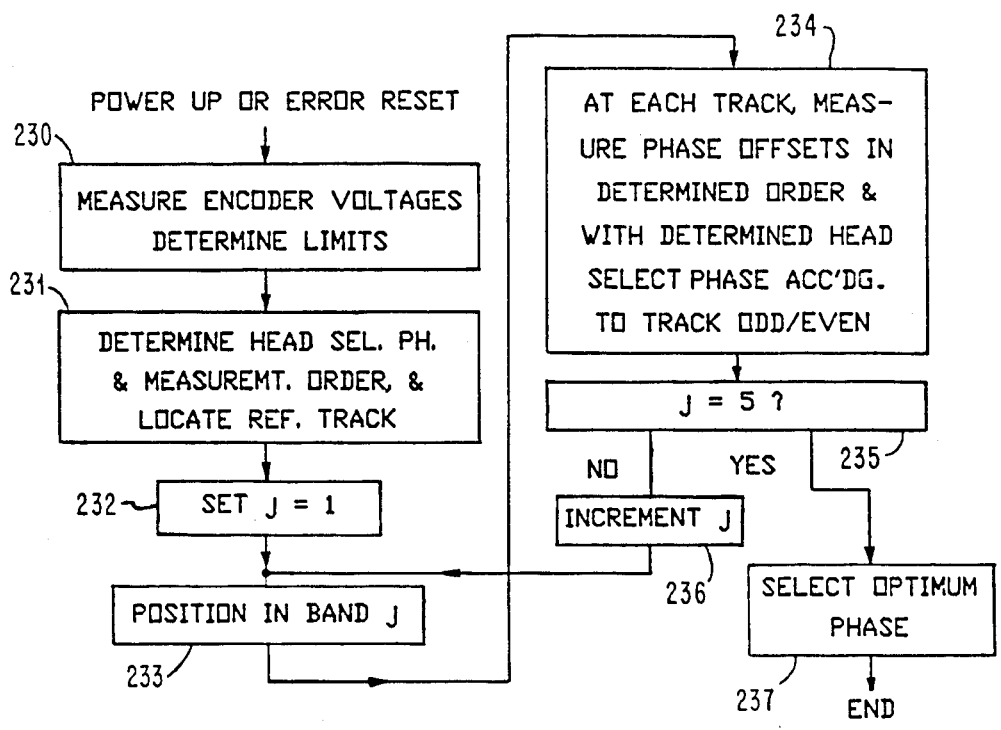

FIG. 10 is a block diagram of a preferred modification of the servo controls of the environmental system in accordance with the present invention, and FIG. 11 indicates how the initializing process of the environmental system (steps 160–165, FIG. 7) is modified to use the circuit of FIG. 10 for avoiding the disabling misregistration conditions just described.

In FIG. 10, circuit 200 translates the single pair of externally reference signals, Q, R into four pairs of signals Ri, Qi (i=1–4) which are relatively phase staggered at 45 degree phase intervals. The latter signal pairs are connected as inputs to circuits 201 which effectively operate as a selecting switch, controlled by signals on lines 202, for selectively connecting any one of the four input pairs to its output 203.

Figure 12A:
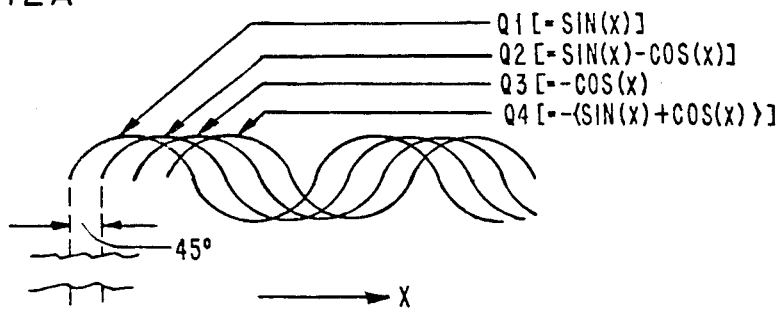
FIGS. 12A and 12B illustrate phase relationships between pairs of quadrature and reference signals produced by the circuits of FIG. 9.
Figure 12B:
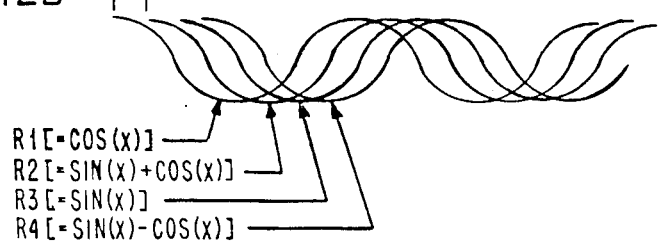
Figure 13:
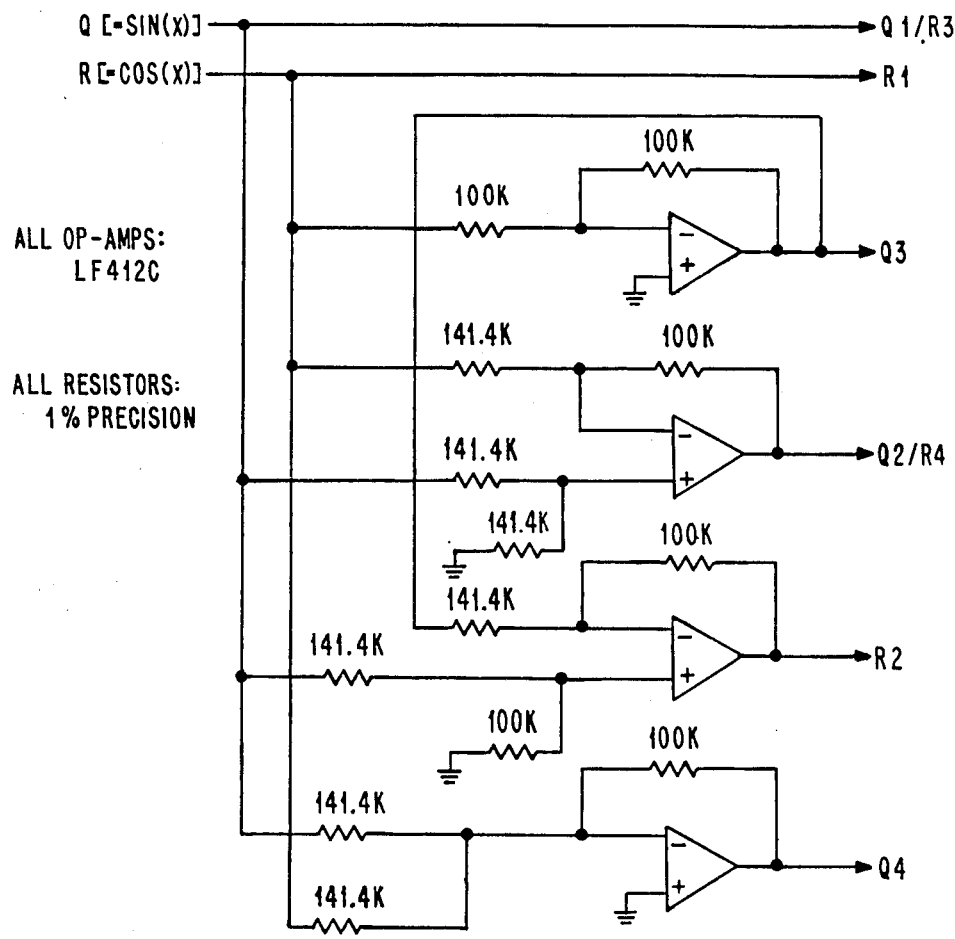

As shown in FIGS. 12A and 12B, signals Qi (i=1–4) are phase staggered at 45 degree phase intervals and signals Ri are similarly staggered. These figures also indicate that the signals of each pair Ri, Qi (i=1–4) are in relative phase quadrature, with the phase of Ri leading that of Qi by 90 degrees. According to these figures:

$Q1 = \sin(x) = Q$
$R1 = \cos(x) = R$
$Q2 = \sin(x) - \cos(x) = Q - R$
$R2 = \sin(x) + \cos(x) = Q + R$
$Q3 = -\cos(x) = -R$
$R3 = \sin(x) = Q$
$Q4 = -[\sin(x) + \cos(x)] = -R2$
$R4 = [\sin(x) - \cos(x)] = Q2$ where the variable x represents the angular displacement of the head assembly from a common reference position discussed below.

Referring again to FIG. 10, circuit 201 is controlled by encoded signals on a pair of lines 202 (e.g. from microprocessor 16, FIG. 1) to select one of its four input pairs and apply that pair to its output 203. Thus, circuit 201 constitutes the circuit equivalent of a simple 2 to 4 line analog data selector (e.g. DG509A by Siliconix). The decoding part of circuit 201 may operate as either a simple binary decoder: (0,0) to S1, (0,1) to S2, (1,0) to S3, (1,1) to S4, where the terms in parentheses represent the input values and Si (i=1–4) represent respective selected data input terms; or as a "Gray Code" decoder: (0,0) to S1, (0,1) to S2, (1,1) to S3, (1,0) to S4.

Circuit 200 comprises active parts 210–212 for developing the functions Q2, R2, Q3 and Q4. The other functions—Q1, R1, R3 and R4—involve simple translations of Q, R and Q2.

Exclusive OR circuit 214 controls selection of QX polarities at which servo sensing heads A2 and B2 (FIG. 2) are selected as a function of its two-state controlling input "Switch Head". When the later function is low (or 0-valued), A2 and B2 are respectively selected as QX goes high and low, whereas when "Switch Head" is high, B2 and A2 are respectively selected as QX goes high and low. This allows for correcting for an odd multiple of a full track width misalignment of the positioning controls as described below.

Figure 14:
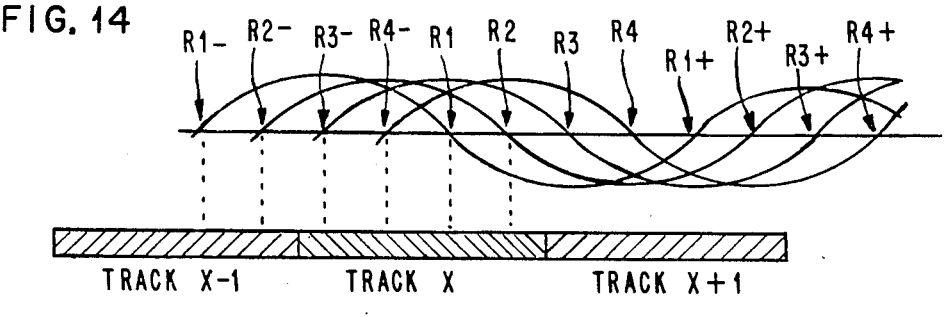

Circuits 210 form both the sum and difference of the input waveforms Q and R, while circuit 211 inverts R and circuit 212 forms the inverse of R2. For proper operation, circuits 210 should include scaling impedances for effectively multiplying its sum and difference outputs by scale factors of 0.707. This is needed to reduce the peak output voltage of this circuit from 1.414 to 1 (to match the peak levels of the sine and cosine inputs). Details of circuits 200 are indicated in FIG. 14.

FIG. 11 indicates how the present invention operates relative to the circuits of FIG. 10 to effectively optimize registration of the servo subsystem. Referring to FIG. 11, at system initialization (i.e. when the system is initially powered up, or when it is reset on detection of error) "calibrating" operations 230–237 are performed, after which the system is readied for carrying out "normal" track seeking and transducing functions. While the calibrating operations are in progress, the system is unavailable for normal operations. These operations may be performed under the direction of the system microprocessor 16 (FIG. 1) which, in the environmental system, is adapted for performing elementary functions relative to the head assembly and servo subsystem by means of which the above operations can be accomplished.

In the environmental system, the initial calibrating procedure includes measurements of sensitivity characteristics of the encoder. These are made by applying incremental voltage changes via the output of DAC 13 (FIG. 1), causing incremental movements of the head assembly and observing the limit conditions for producing polarity changes in pulse signals QX and RX (FIG. 6) which respectively represent movements across track boundaries and track centerlines. In the present operations 230, these sensitivity measurements are performed for each of the signals Qi (i=1–4); i.e. circuit 202 is conditioned to select each signal Qi, and information representing corresponding limiting conditions relative to QX and RX are determined and stored. From these measurements, the system can, for each signal pair Qi, Ri, establish DAC voltage "servo limit" values which insure that servo operation is not attempted too near "peaks" of the Ri signal which would lead to improper operation, and establish bias values which correspond to the DAC voltage value required to precisely position the encoder at the zero crossing transition of Ri which defines the "center" of the servo range.

Figures 15, 16, 17:
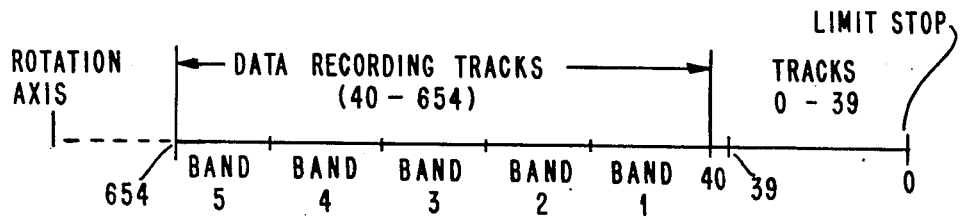

The present guardband and track layout is shown in FIG. 17. In the present calibrating operation 231, the head assembly is positioned to reference track 40 (FIG. 17) which is the first data recording track (track address 0 in system notation). For this, the system commands a first movement of the assembly to the outer limit stop (FIG. 3), followed by an inward movement of 20 track increments referenced to one of the phase pairs, Ri, Qi, followed by operations to determine a proper head select phase and a proper order of selection of Qi, Ri as described below, followed by single track increments of inward movement and further position determining operations described below. The 20 track movement positions the head assembly within 40 tracks of the reference track (assuming that any misalignment or warpage of the head carrier does not exceed 20 tracks).

At completion of this movement, the heads should be located over a track in the "guardband" area. Several measurements are taken in this position to determine a proper phase of "switch head" (FIG. 10) and a proper one of the pairs Ri, Qi to use in locating reference track 40 and a proper order of selection of the pairs Ri, Qi for subsequent offset measurements. Selection of the proper signal pair for locating reference track 40 insures that the phase used does not position the heads near a boundary between tracks. Such positioning would not yield repeatable measurement results which could lead to improper reference track location. The proper value of switch head (and hence servo head select) is required to insure that proper servo information is being utilized by the servo system. The order of phase measurement is important due to the requirement that all measurements be taken on the same track. A misalignment situation is likely to occur (see FIG. 14) if zero crossings of R1 and R2 are located over track X while corresponding transitions of R3 and R4 are located over track X+1. In this situation, the zero crossings of R3 and R4 that occurred prior to R1 and R2 are on the same track as R1 and R2 and are the transitions of interest. These prior transitions are referred to as R3— and R4— (see FIG. 14). Similarly, a condition will occur where R2, R3 and R4 are on a track of interest and the zero crossing of R1 which occurs after R4 is also on that track. This zero crossing is termed R1+.

The aforementioned determinations of proper phase pair and head selection positions can be made by taking simple measurements in the guardband area (e.g. 20 tracks inward from the outer stop). These measurements consist of determining the value of "Switch Head" (FIG. 10) required to sense "left" bursts coincident with zero crossings of successive phases in the order R1, R2, R3 and R4. A change in polarity in the "Switch Head" value indicates transition from one track to another. In order to properly locate the reference track (track 40, FIG. 15), a phase which is not adjacent to a phase with opposite "Switch Head" polarity should be used. This phase is insured to not be in a boundary situation. FIG. 16 details the "proper" associations between "Switch Head" values and phase pair to use for locating the reference track.

The foregoing discussion does not indicate precisely how to switch between the "i" signal pairs during either the determination of the "proper pair" for reference track location or the subsequent taking of offset measurements (step 234, FIG. 11, discussed below). The simplest way to accomplish this would be to turn the servo power amp off before each switching action. However, this would be inefficient in respect to use of time. I prefer to have the switching conducted while the system is active and susceptible of "smooth" transition (i.e. when current and succeeding centering references are at a point of common voltage).

For example, in switching from R1 to R2, as centering references, it is desirable to switch at a point where these functions have common amplitudes (i.e. where their waveforms, FIG. 14, intersect). More precisely, this occurs when the phase of R1 is at 90+22.5 degrees from its 0 phase/voltage crossing. Since it is not possible for the system to move through the peak of the controlling reference (R1) while in position mode (see discussion of FIGS. 5 and 6), the system is commanded to seek one track forward and then reverse increments of movement are commanded until the common voltage phase is reached. At that point, the switch to the next pair is made. Switches between R2 and R3, and between R3 and R4, may be made in similar fashion.

Switching from R4 to R1 is accomplished somewhat differently. The common voltage intersection for R4 and R1 occurs at +22 degrees from the 0 phase 0 voltage crossing of R4. Thus, after centering on R4, the switching can be made by simply commanding increments of forward movement in position mode equaling 22 degrees of phase shift (i.e. without an additional seek) and then switching to R1.

The reference track is located by selecting the proper phase pair for location, as previously determined, and stepping inward in single track increments under direction of the selected pair, noting the value of offtrack sense at the end of each single track seek. When the value of offtrack sense changes from left to right indication, the next track is defined (by the servo information) to be reference track 40 or logical track 0 (see FIG. 17). This transition could occur 1 to 40 tracks from the initial location 20 tracks inward from the physical stop.

In the next stage of operations (FIG. 11), indicated at 232, band count parameter "j" is set to 1. Parameter "j" designates 1 of 5 track bands (FIGS. 3, 17). With this parameter set at 1, operations 233 and 234 are conducted to position the head to an even numbered track in band 1 and then an odd numbered track in the same band, using the proper phase pair and head select position determined above. At each track, measurements of head offset are taken for each phase pair in the determined order (FIG. 16). Each offset measurement involves sensing the polarity of "offtrack sense", applying corrective increments of actuation until the offset is nullified, and determining the number of corrective increments required for nullification. The offset values thus determined within band 1 are stored in association with the respective phase pair and selected band.

At 235, the value of "j" is examined. If less than 5, the value is incremented (at 236) and operations 233 and 234 are repeated. When offset values for all five bands have been established, the "yes" exit at decision 235 is taken, and operations 237 are conducted. In these operations, the offset measurements obtained for all pairs Ri, Qi in all bnads are compared and an optimum pair is selected as the positioning reference for subsequent "seeks". The "Switch Head" value associated with that pair is also selected. The "optimum" pair is the one having the smallest offsets. In addition, the system microprocessor stores offset correction functions for nullifying offsets measured for the selected pair in each band. The system is then readied for normal track seeking and transducing operations, and in subsequent seeks the correction function for the respective band is applied as the seek motion concludes (via switch 112, FIG. 5).

Although I have described a preferred embodiment of my invention above, those skilled in the art will readily appreciate that equivalent effects could be achieved by other means and methods representing minor variations of the technique defined above. It is intended that such variations be encompassed by the following claims.

What is claimed is:

1. In a rotating disk storage system, a method of preparing servo controls for positioning a transducing head assembly in alignment with recording tracks on the disks comprising:

setting said system in a calibrating mode;
   applying a plurality of different electrical signals sequentially to said servo controls as positioning references; said signals varying periodically as said head assembly is moved relative to the enclosure of said system and being staggered in phase relative to each other by phase increments corresponding to fractions of the space between consecutive said recording tracks;
   for each said signal application, commanding a series of calibrating movements of said head assembly relative to said tracks;
   measuring offsets of the head assembly from centers of tracks nominally located at positions corresponding to destinations of said calibrating movements;
   comparing offset measurements obtained for all of said applied signals over respective movements;
   selecting one of said signals having the least average offset over all of its respective movements;
   coupling the selected signal to the servo controls as an exclusive seek positioning reference; and
   setting said system to a normal operating mode for conducting normal transducing operations relative to said disks, with said selected signal thereafter controlling seek movements.

2. The method according to claim 1 for effectively optimizing registration between external indicia sensed by said servo subsystem and servo signals embedded on said disks, wherein consecutive recording tracks are assigned consecutive odd and even identifying numbers, and wherein servo signals associated with odd and even numbered tracks are respectively stored on opposite surfaces of a disk and sensed by opposite head elements in said head assembly, said method comprising:

commanding an initial movement of said head assembly to a reference track position prior to commanding said series of track seeking movements;
   at completion of said initial movement, determining if the assembly is offset from the center of the reference track by an even or odd number of track widths; and
   conditionally switching odd/even associations of said opposite head elements if the offset from the reference track is an odd number of track widths.

3. The initializing method of claim 2 comprising:
   at completion of said initial movement determining a proper order of application of said signals for avoiding ambiguities in said offset measurements; and
   applying said signals in said order to said subsystem for conducting said offset measuring steps.

4. In a disk storage system, in which a transducing head assembly is moved under control of a servo subsystem relative to concentric recording tracks on rotating disks, said subsystem controlling track seeking and track following operations relative to said head assembly, said subsystem deriving positional references for track seeking from indicia external to said disks and positional references for track following from a combination of said external indicia and servo signals embedded on said disks, a method for optimizing the effective alignment between said external indicia and embedded servo signals comprising conducting calibrating operations during initialization of said systems, said operations comprising:

generating a plurality of electrical signals associated with said external indicia as said head assembly is moved relative to said indicia; said signals varying in a periodic manner as successive indicia are traversed and being offset in phase relative to each other by discrete phase increments representing predetermined fractions of the space between consecutive recording tracks;
   applying each of said signals separately to said subsystem as a positioning reference for track seeking;
   commanding a predetermined series of track seeking movements of said head assembly for each said signal application;
   measuring offset of said head assembly from the center of the nearest track at completion of each movement;
   comparing offset measurements obtained for different ones of said associated signals;
   selecting one of said signals having a pattern of smallest offsets; and
   applying said selected signal to said servo subsystem as an exclusive controlling reference for subsequent track seeking and normal transducing operations.

5. In a rotating disk storage system wherein a servo control subsystem controls track seeking and track following movements of a transducing assembly, and wherein said track seeking movements are controlled exclusively with reference to external indicia fixed with respect to the supporting frame of the system while said track following movements are controlled coarsely with respect to said indicia and finely with reference to embedded servo signals recorded on said disks, a method for initializing said system so as to effectively optimize the alignment between said external indicia and said embedded servo signals comprising:

generating plural pairs of signals as said head assembly is moved relative to said indicia, the signals of each pair varying periodically in phase quadrature during increments of movement corresponding to spaces between tracks; the phases of different ones of said pairs being pair-to-pair staggered at intervals corresponding to predetermined fractions of the space between tracks;
   upon initial powering on of said system, selecting each of said signal pairs separately and applying the respective pair to the servo subsystem as a temporary reference for track seeking;

for each such temporary application, commanding a predetermined series of movements of said head assembly;

at completion of each movement of said series, measuring the offset of said head assembly from the center of a nearest track, by sensing embedded servo signals aligned with that track;

comparing offsets measured for different ones of said signal pairs, and selecting a signal pair having smallest overall offsets; and applying the selected signal pair to said servo subsystem as an exclusive positioning reference for subsequent track seeking and normal transducing operations.

6. In a disk storage system, wherein a transducing head assembly is positioned to recording track positions by means of a servo control subsystem which operates with reference exclusively to external frame reference indicia for moving the assembly between separated track positions and which operates with coordinated reference to said external indicia and servo signals prerecorded on a disk surface to maintain the assembly in a track following mode relative to a desired track centerline, the improvement comprising:

means for sensing said external indicia;

means coupled to said sensing means for deriving a plurality of signal pairs associated with said indicia, each said pair comprising signals which vary periodically in direct correspondence with displacements of said head assembly relative to said indicia, the signals of each pair having quadrature phase relation relative to each other, the signals of different ones of said signal pairs being discretely staggered in phase relative to each other;

means coupled to said signal air deriving means for selectively applying any one of said signal pairs to said servo control subsystem;

means for operating said system selectively in an initializing mode and a normal read/write mode;

first means cooperative with said applying means in said initializing mode for applying each of said signal pairs to said subsystem separately as a positioning reference, while directing a series of track seeking movements;

second means cooperative with said first means for evaluating offsets of said head assembly from track centers at completions of said movements; and third means responsive to said second means for conditioning said applying means to select one of said signal pairs having the most accurate positioning effect for application to said subsystem in said normal mode.

7. In a disk storage system in which a transducing head assembly is moved relative to recording tracks on disks by a servo subsystem, and in which said subsystem derives its positional reference for controlling track seeking movements of said assembly from indicia external to said disks and its positional reference for controlling said assembly to follow a particular track from both said external indicia and pre-recorded servo signals embedded in said recording tracks, a method for maintaining alignment between said subsystem and said tracks regardless of the physical alignment between either said head assembly or the external indicia and said tracks comprising:

varying the effective alignment between said external indicia and said subsystem in discrete phase increments corresponding to predetermined fractions of the width of a said recording track;

for each variation in effective alignment, commanding said subsystem to move said head assembly through a predetermined series of track positions relative to said disks;

in association with each of said series of movements sensing embedded servo signals located at said track positions and determining therefrom offset measurements representing displacements of said assembly from centers of tracks at said positions;

comparing offset measurements determined for all of said variations in effective alignment and determining which of said variations has the smallest offsets;

establishing an effective alignment between said subsystem and external indicia corresponding to the variation having said smallest offsets; and conditioning said system for conducting normal track seeking and transducing operations relative to said disks with said established effective alignment.

8. The method of claim 7 wherein said step of varying effective alignment is accomplished by:

generating a plurality of electrical signals as said head assembly is moved relative to said indicia, each signal varying periodically as said head assembly is moved across successive indicia with a periodicity corresponding to an integral multiple of the width of a track; said signals being staggered in phase relative to each other by discrete phase increments corresponding to predetermined fractions of a track width; and applying said signals separately to said servo subsystem as positioning references for respective said series of commanded movements.

9. The method of claim 7 wherein said step of varying effective registration is accomplished by:

generating a plurality of pairs of phase staggered electrical signals, each pair varying periodically as said head assembly is moved relative to said indicia with a periodicity corresponding to an integral multiple of a track width, the signals of each air being in phase quadrature; said pairs being staggered in phase relative to each other by discrete phase increments corresponding to predetermined fractions of a track width; and applying each of said pairs of signals separately to said servo subsystem as positioning references for respective said series of commanded movements; predetermined phase transitions in one signal of each applied pair thereby serving as positioning references for locating boundaries between successive tracks and corresponding transitions in the other signal of the same pair serving as references for locating centers of tracks.

10. In a rotating disk storage system, a method of preparing servo controls for positioning a transducing head assembly in alignment with predetermined physical locations of recording tracks on one or more disks comprising:

setting said sytem in an initializing mode when said system is either being initially powered up or is recovering from error; and while in said mode:

positioning said head assembly at a median position within a guardband of non-recording tracks located outward of a range of recordable tracks on said disks;

at said median position, applying a plurality of electrical signals to said servo controls as positioning references, said signals being derived from indicia external to said disks and varying in a periodic form as said assembly moves relative to indicia spaced at intervals corresponding to the spacing between tracks on said disks, said signals being staggered in phase relative to each other by phase increments corresponding to predetermined fractions of the space between successive tracks;

determining an order of application for said signals for enabling subsequent acquisition of a set of unambiguous offset measurements relative to said recordable track range;

selecting one of said signals as a reference for unambiguously locating a reference track within said recordable track range;

positioning said head assembly to said reference track with said servo controls directed by said selected one of said signals;

positioning said head assembly to a plurality of other track positions within said recordable range;

at each of said other track positions, applying each of said reference signals separately to said servo controls as a positioning reference in said determined order, and for each such application at each position measuring the offset of the assembly from the physical center of an associated recording track;

comparing said offset measurements;

selecting one of said signals having an optimum set of offset measurements;

applying said selected optimum signal to said servo controls; and setting said system to a normal operating mode permitting use of said system in normal track seeking and read/write data recording operations.

11. The method of claim 10 wherein consecutive tracks in said recording range are addressed by odd and even address numbers and one of the disks contains servo signals embedded in a sector for controlling track following operations of said servo controls; wherein the servo signals associated with said physical tracks are aligned with respective tracks; and wherein the servo signals respectively associated with odd and even addressed tracks are disposed on opposite surfaces of said one disk; said method comprising:

with said head assembly at said median position, conducting switching operations between heads communicating with said opposite surfaces to determine a proper association between said heads and transitional phases of said position reference signals.

* * * * *